United States Patent [19]

Meuschke

[11] Patent Number: 4,666,658
[45] Date of Patent: May 19, 1987

[54] REFUELING OF NUCLEAR REACTORS
[75] Inventor: Robert E. Meuschke, Pittsburgh, Pa.
[73] Assignee: Westinghouse Electric Corp., Pittsburgh, Pa.
[21] Appl. No.: 552,231
[22] Filed: Nov. 16, 1983
[51] Int. Cl.$^4$ ............................................. G21C 19/00
[52] U.S. Cl. ................................ 376/263; 294/87.1; 294/906; 376/260; 376/262
[58] Field of Search ................. 294/87.1, 90, 906; 376/260, 261, 262, 263, 264, 268

[56] References Cited
U.S. PATENT DOCUMENTS

| 3,768,668 | 10/1973 | Schukei ............................... 376/262 |
| 3,830,536 | 8/1974 | Frisch et al. . |
| 3,851,906 | 12/1974 | Frisch et al. . |
| 4,134,789 | 1/1979 | Aubert ................................ 376/262 |
| 4,272,321 | 6/1981 | Betancourt et al. ................ 376/262 |

Primary Examiner—Deborah L. Kyle
Assistant Examiner—Richard W. Wendtland
Attorney, Agent, or Firm—Daniel C. Abeles

[57] ABSTRACT

During unrodded refueling, the drive rods and the control rods and coolant-displacement rods, attached to the drive rods, are removed from a fuel assembly, preliminary to the transfer of the fuel assembly, and are reinserted in the reactor after a replacement fuel assembly has been positioned in the reactor. Prior to the transfer of a fuel assembly, a lifting rig is secured to the upper-internals support. A lift plate is removeably mounted on latches in a lower position of the lifting rig. The latches are released and the lift plate is connected to the drive rods. The lift plate is then raised and removeably mounted on latches in an upper position on the lifting rig. In this position, the control rods and coolant-displacement rods are in the guides in the upper internals of the reactor. During the lift-plate raising operation, the loading on the drive rods is monitored and if the loading exceeds a predetermined magnitude, the excess loading is indicated. After the lift plate and the rods suspended from it are positioned on the latches in the upper position, the lifting rig and the upper internals and rods attached to the lift plate are removed from the reactor so that the unrodded transfer of the fuel assemblies may proceed. The replacement of the rods proceeds reversely. In this case, the device which indicates excess loading of a drive rod operates to indicate that the control rod or coolant-displacement rod connected to the drive rod has encountered an obstruction.

9 Claims, 16 Drawing Figures

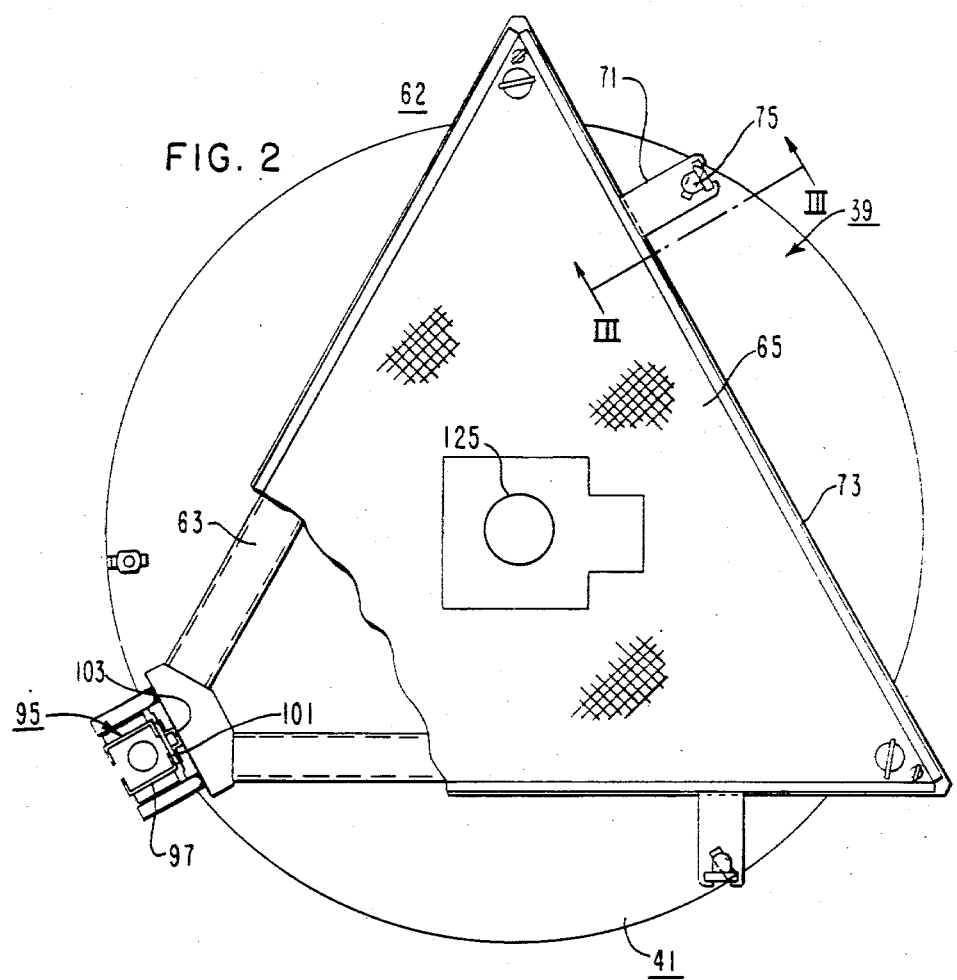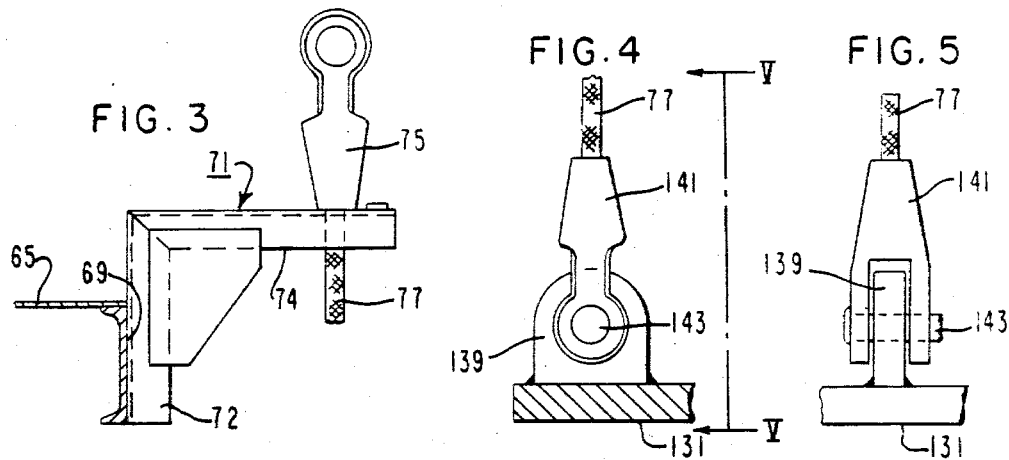

FIG. 9
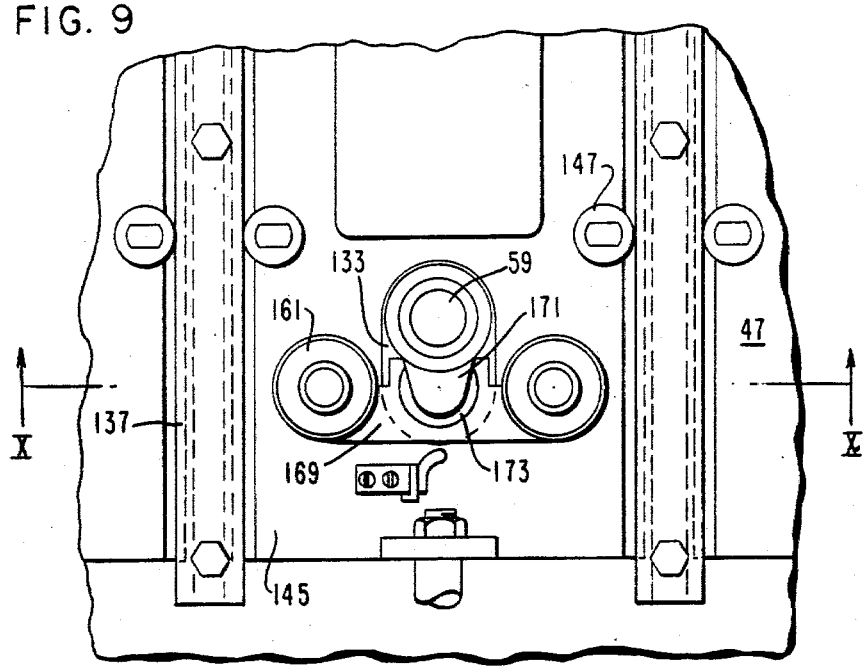
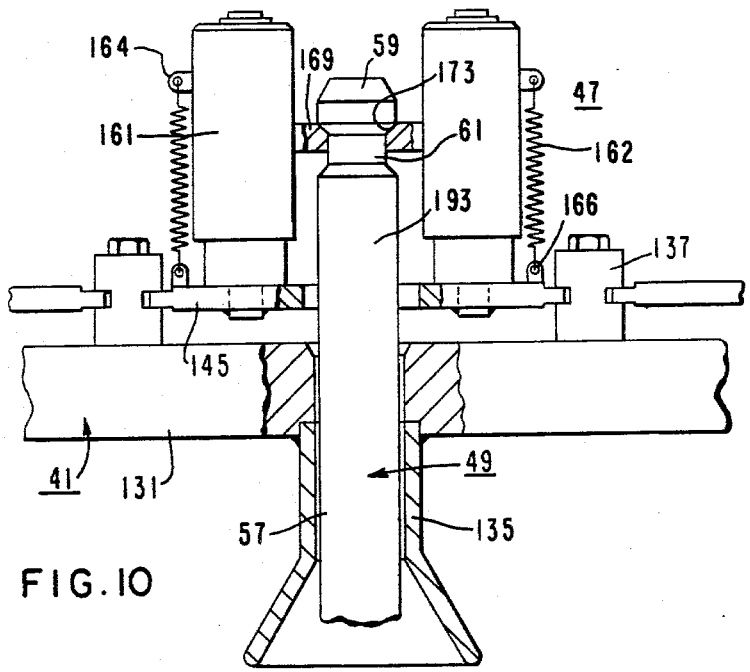
FIG. 10

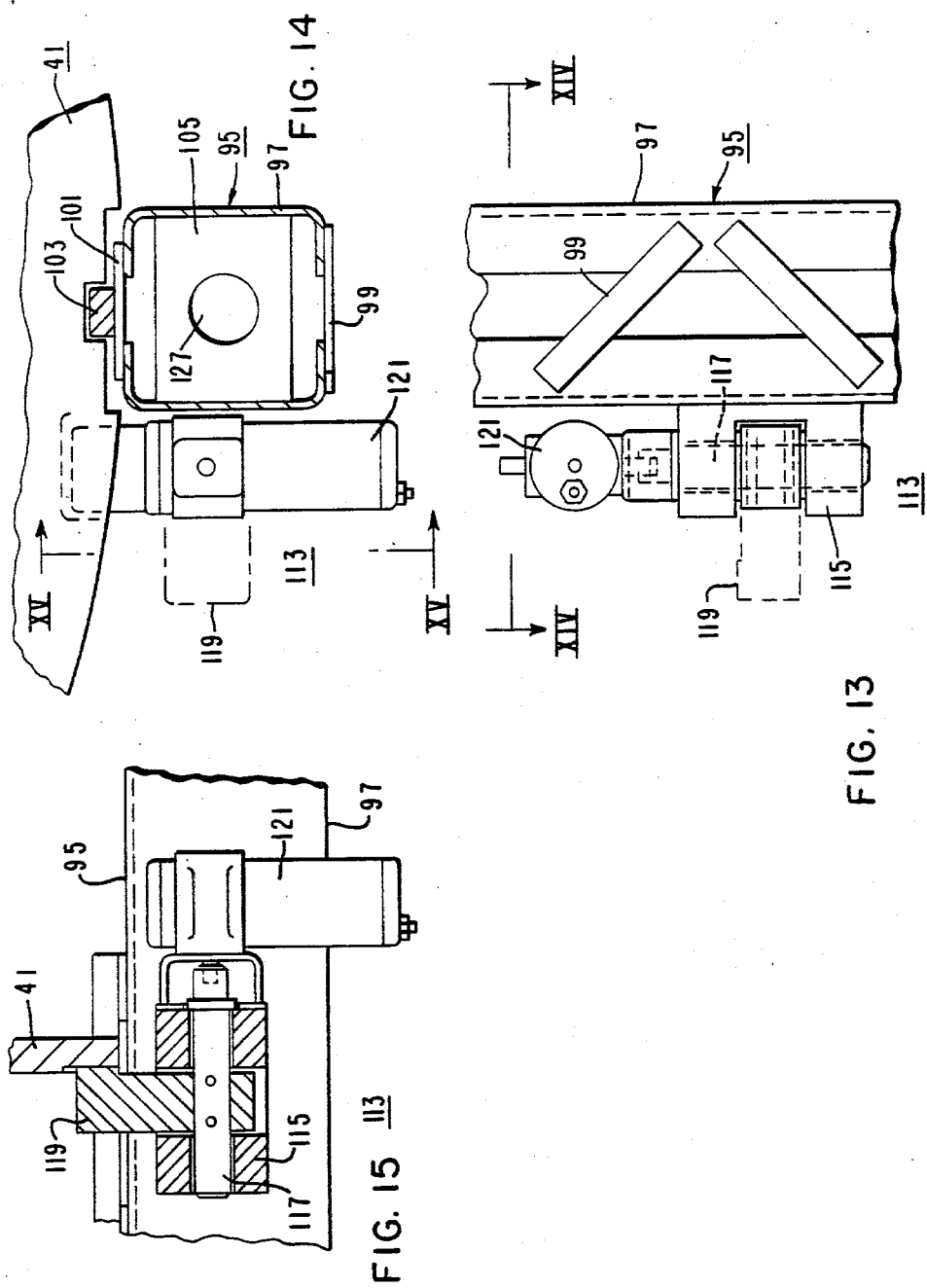

REFUELING OF NUCLEAR REACTORS

BACKGROUND OF THE INVENTION

This invention relates to nuclear reactors and it has particular relationship to such processes as the refueling of nuclear reactors. Typically, a nuclear reactor includes a plurality of fuel assemblies. Each fuel assembly includes a plurality of fuel elements. In addition, a fuel assembly includes a plurality of thimbles in which control rods and coolant-displacement rods are removably inserted. Coolant-displacement rods are sometimes referred to as moderator rods. These control and moderator rods will sometimes be referred to herein together as penetrating rods because they penetrate into a fuel assembly. Each penetrating rod is connected to a drive rod which is operated to insert or remove the penetrating rod from its thimble. Typically, there may be as many as 185 sets of drive and penetrating rods for each fuel assembly.

The practice in accordance with the teachings of the prior art for removing a fuel assembly during refueling or for other purposes has been to remove the fuel assembly as a whole including its penetrating rods. This practice demands that each drive rod be disconnected from its associated penetrating rod. This disconnecting operation is time-consuming and costly particularly as the drive rods and penetrating rods are radioactively contaminated and are under water and the disconnection must be carried out with long-handled tools operated from a platform 30 or 40 feet above the reactor. To overcome this drawback, it is desirable that the transfer of each fuel assembly during refueling or the like be an unrodded transfer. The formidable task of disconnecting the drive rods from their associated penetrating rods is by this practice dispensed with. Preliminary to the transfer of a fuel assembly, the drive rods with the penetrating rods suspended from them are removed as a unit form the reactor and the transfer proceeds without the penetrating rods. After a fuel assembly is replaced, the drive and penetrating rods are replaced in the reactor and the penetrating rods are inserted in the thimbles of the replaced fuel assembly.

It is an object of this invention to provide a method for removing and replacing as a unit the drive rods and the associated penetrating rods of a fuel assembly from a reactor during a refueling operation or the like. It is also an object of the invention to provide apparatus uniquely suitable for practicing this method. Another object of this invention is to provide such a method and such apparatus in whose practice and use excessive loading of a drive rod during a removal operation or the excessive unloading of a drive rod during a replacement operation, such as might occur when a penetration rod encounters an obstruction, shall be detectable.

SUMMARY OF THE INVENTION

In accordance with this invention the drive rods and penetration rods are removed as a unit by cooperation of a lifting rig and a lift plate. For removal of the rods of a fuel assembly, the lifting rig is secured to the structure of the upper internals of the reactor. The lift plate includes a plurality of mechanisms, each adapted to be engaged with, and disengaged from, a drive rod of a fuel assembly. Typically, the drive rods are arrayed in a plurality of linear columns. The mechanisms for engaging and disengaging the drive rods of each column are arrayed on a separate actuator plate which is advanced or retracted by a fluid driven piston. Initially, the lift plate with its mechanisms if removably supported at a lower position or lower level on the lift plate. At the start of a removal operation, this lower-level support is removed and the lift plate is dropped so that the heads of the drive rods penetrate through the lift plate in position to be engaged by the mechanisms. The pistons are then driven so that the heads of each drive rod is engaged with, and seated on, its associated mechanism. The lift plate, with the drive rods and their penetration rods suspended from it, is now raised to an upper position or level of the lifting rig and is supported in this position. In this position, the penetration rods are withdrawn into the guides in the upper internals. With the lift plate and the rods suspended from it on the lifting rig, the lifting rig and the upper internals are now raised and removed. The transfer of a fuel assembly may now proceed. Each drive-rod engaging mechanism includes a switch which is actuated and enables an indicator if the drive rod is excessively loaded.

While the fuel assembly is being replaced, the lifting rig is left in the state that it was when removed from the reactor. The lift plate and the rods suspended from it are supported in the upper level of the lifting rig and the lower internals are suspended from the lifting rig. After all fuel assemblies that require replacement are replaced the lifting rig with lift plate and the rods supported thereon and the upper internals suspended therefrom is returned to the reactor and the upper internals and the control and moderator rods are positioned in the reactor. The upper-level support for the lift plate is then removed and the lift plate and the rods suspended from it are lowered. The penetrating rods are now inserted in the thimbles of the replaced fuel assemblies and any other assemblies from which they have been removed. The drive rods are then disengaged from the mechanisms so that the penetrating rods are properly seated in the thimbles. The lift plate is set at the lower level and the lifting rig is disengaged from the upper internals and is removed together with the lift plate. The switch on each engaging mechanism enables a signal if any rod encounters an obstruction.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 2 is a plan view taken in the direction II—II of FIG. 1;

FIG. 3 is a fragmental view enlarged taken along line III—III of FIG. 2;

FIG. 4 is a fragmental view enlarged, with a portion in transverse section, of the part of the apparatus within the rectangle IV of FIG. 1;

FIG. 5 is a fragmental view in side elevation in the direction V—V of FIG. 4;

FIG. 9 is a fragmental view enlarged of the part of the apparatus within the rectangle IX of FIG. 6, showing particularly the engaging-and-disengaging mechanism for the drive rods for the control rods;

FIG. 10 is a view in section taken along line X—X of FIG. 9;

FIG. 13 is a fragmental view in side elevation showing a latch by means of which the lift plate is removably supported on the lifting rig;

FIG. 14 is a fragmental plan view, partly in transverse section, taken in the direction XIV—XIV of FIG. 13; and FIG. 15 is a fragmental view in side elevation and partly in longitudinal section taken in the direction XV—XV of FIG. 14.

DESCRIPTION OF THE PREFERRED EMBODIMENTS

Figure 1:
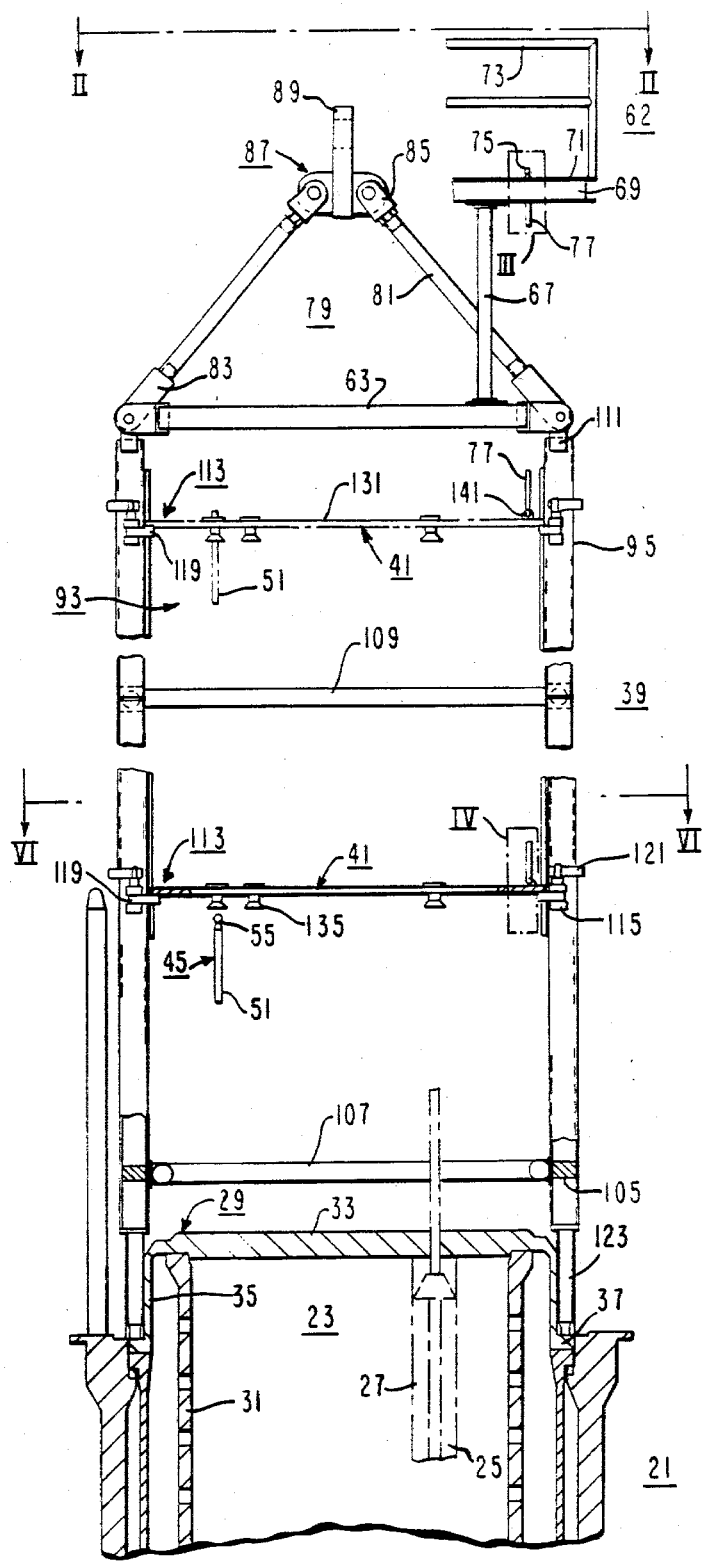
FIG. 1 is a view in side elevation, partly in longitudinal section of apparatus in accordance with this invention with which the method of this invention is practiced.

In the drawings, this invention is illustrated as applied to the refueling of a reactor 21 (FIG. 1). The top of the reactor 21 is shown fragmentally in section with the head of the pressure vessel removed exposing the upper internals 23. The upper internals includes guides for the control rods and the moderator, but neither the guides nor the rods are shown except that a control rod 25 is shown in a guide 27 in broken lines for illustrative purposes. The upper support plate 29 for the rod guides and the perforated shell 31 connected to plate 29 are shown. The upper support plate 29 is of generally U transverse section including a circular flat portion 33 from which an attenuated circularly cylindrical vertical sidewall 35 extends. The sidewall 35 terminates in an annular flange 37.

The apparatus in accordance with this invention includes a lifting rig 39 (FIGS. 1, 2), a lift plate 41 (FIGS. 1, 2, 6, 6A) and engaging-and-disengaging mechanism 43 (FIGS. 7, 8) for the drive rods 45 for the moderator rods (not shown) and 47 (FIGS. 9, 10) for the drive rods 49 for the control rods (not shown). The engaging-and-disengaging mechanisms 43 and 47 are mounted on the lift plate 41. The drive rod 45 (FIGS. 1, 8) has a cylindrical body 51 tapered near the top. A tapered stem 53 extends from the body 51. The stem 53 terminates in a tip 55 in the form of a cone terminating in a spherical surface. In the use of the drive rod 45, the tip 55 is connected to a mechanism for raising and lowering the drive rod 45 and the moderator rod connected to it. The drive rod 49 (FIG. 10) has a cylindrical body 57 terminating at the top in a tip 59 in the form of a truncated cone from which a short cylinder extends. The tip 59 is separated from the body by a neck 61. In the use of the drive rod 49, the tip 59 is connected to a mechanism for raising and lowering the drive rod 49 and the control rod connected to it.

The lifting rig 39 (FIGS. 1, 2, 3) includes a spreader assembly 62. The base of the assembly 62 is formed of three tubular members 63 of square transverse cross section connected in a triangular configuration. The assembly 62 also includes a triangular platform 65 mounted on columns 67 secured to the members 63 near one end of each (only one column shown). The platform 65 is mounted on a frame of channels 69 (FIG. 3). An angular member 71, formed of abutting vertical and horizontal channels 72 and 74 is secured to each channel 69 by its vertical channel 72. The angular member 71 supports a railing 73 for the platform 65 (FIG. 1). The horizontal channel 74 of each angular member carries an islet 75 from which a cable 77 extends. The eyelet 75 is adapted to be connected to a hoist (not shown) on the platform 65.

A tripod 79 (FIG. 1) is pivotally connected at the apeces of the triangle formed by the tubular members 63. The tripod 79 includes three rods 81 (only two shown). Each rod 81 is screwed into a sleeve 83 pivotally connected to the corresponding apex of the triangle. At the upper end, each rod 81 is screwed into a sleeve 85 of a clevis block 87. A rod 89 for connection to a crane (not shown) extends from the clevis block 87.

A rigid skeletal member 93 extends from the base formed by the members 63. The skeletal member 93 includes a plurality of columns 95 (only two shown) (FIGS. 1, 6, 12, 13, 14). Each column 95 is formed of oppositely disposed channels 97 secured together by cross plates 99 and 101 (FIGS. 6A, 13, 14) welded to their flanges. A guiding block 103 is secured to the inner plates 101. Plates 105 extend between the channels at positions along their length. The skeletal member 93 is formed into a rigid structure by ring girders 107 and 109 (FIG. 1). The skeletal member 93 is suspended from the spreader assembly 62 by studs 111, which depend from each apex of the triangle formed by members 63, and are secured to the top of each column 95.

The supporting means for the lift plate 41 are latches 113 (FIGS. 1, 13, 14, 15) extending from each column 95 at a lower level and at an upper level. Each latch 113 includes a yoke 115. The arms of the yoke 115 have holes whose walls serve as bearings for rotatable shaft or pin 117. The shaft 117 carries a projecting member 119. The shaft 117 is rotatable by air injected into an actuator 121 rotating the member 119 between an advanced position in which it is interposed inwardly in the skeletal member 93 and supports lift plate 41 and a retracted position in which it does not support lift plate 41.

A breech-lock rod 123 (FIG. 1) forming a part of a ROTO-LOC securing device extends from each column 95. The ROTO-LOC securing device is disclosed in Frisch et al. U.S. Pat. Nos. 3,830,536 and 3,851,906. The rods 123B are operated from an actuator 125 (FIG. 2) through links (not shown) which extend through the columns 95. The plates 105 (FIG. 14) have holes 127 to permit the passage of these links. Each breech-lock rod 123 is advanced into an opening in flange 37 (FIG. 1) of the upper support plate 33 for the upper internals 23. The rod 123 is then rotated engaging the plate 33 bayonet fashion. The lifting rig 39 may thus be firmly secured to the upper internals 23.

Figure 6:
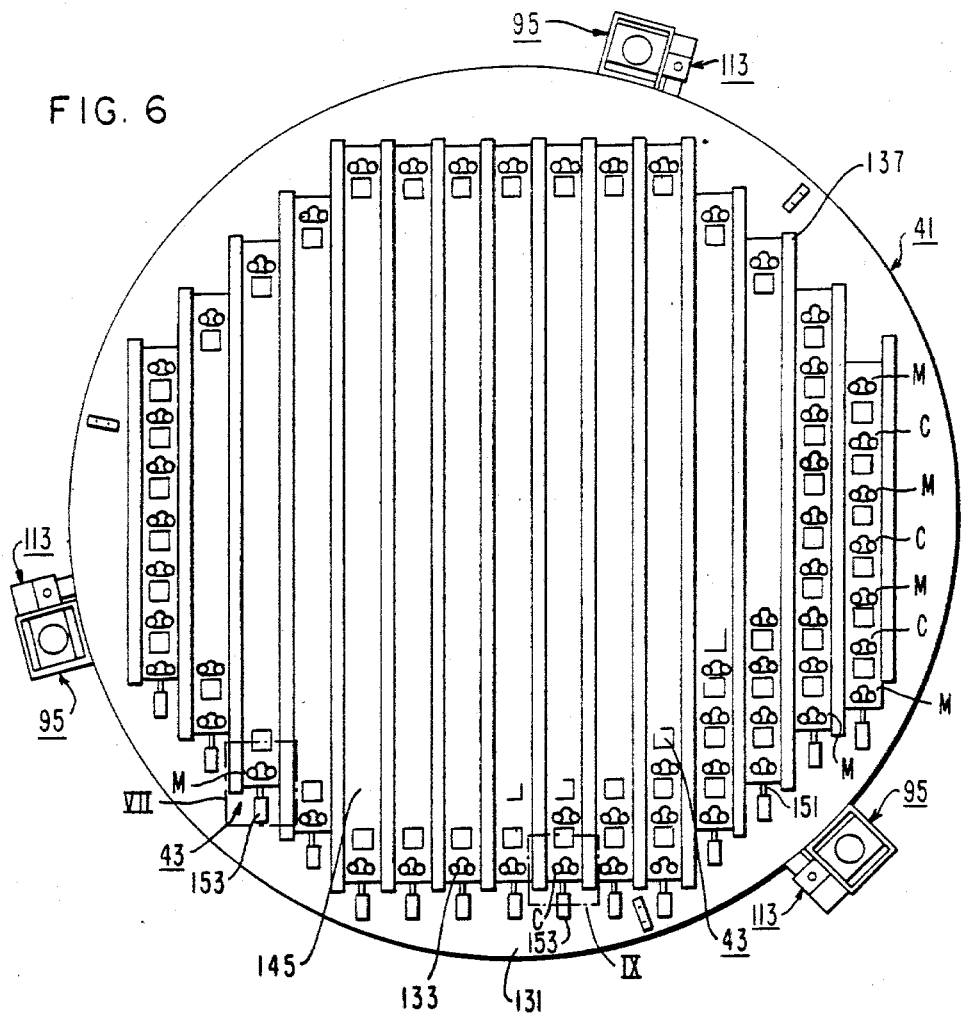
FIG. 6 is a view in section taken along line VI—VI of FIG. 1.

The lift plate 41 (FIGS. 1, 6A, 7, 8, 9, 10) includes a circular disc 131. The disc 131 has a plurality of linear columns of oval holes 133, each column corresponding in number and position to the number and positions of the drive rods 45 and 49 and the moderator and control rods attached to the drive rods. In FIG. 6, a position for a drive rod 45 for a moderator rod is labelled M and a position for a drive rod 49 for a control rod is labelled C. Under each hole 133 a guide 135 (FIGS. 1, 8) for the drive rod 45 or 49 which passes through each hole is provided. Each guide 135 extends vertically downwardly and flares out at the end (FIGS. 1, 8, 10) to facilitate the insertion of the corresponding drive rod. Guide rails 137 (FIG. 6) are bolted to the disc 131. A pair of guide rails 137 extend along each column of holes 133. The interior guide rails are common to adjacent columns. A plurality of brackets 139 (FIGS. 4, 5) are welded to each plate 131 at positions corresponding to the positions of cable 77 (FIGS. 1, 2, 3). At the lower end the cable 77 terminates in a bifurcated member 141 which is connected to bracket 139 by means of a pin 143. The lift plate 41 may be raised or lowered by the hoist (not shown) connected to cables 77.

The engaging-and-disengaging mechanism 43 includes an actuating plate 145 (FIGS. 7, 8) for each column of drive rods 45 or 49. Each actuating plate is provided with rollers 147 along each of the sides. The rollers 147 engage the rails 137 which bound each column of holes 133 laterally. Each actuating plate 145 is driven horizontally forward, to an advanced position and backward to a retracted position by a piston rod 151 advanced and retracted by a piston (not shown) of an air cylinder 153. The actuating plate 145 on the extreme right of FIG. 6 is shown in the retracted position. The other actuating plates are shown in the advanced position.

At each drive-rod position, a pair of studs 155 (FIGS. 7, 8) are mounted on each actuating plate 145. The studs 155 are mounted symmetrically with respect to the vertical axis of the corresponding oval hole 133. Each stud 155 has an annular recess 156 at the bottom and carries a flanged bushing 157 (FIG. 8) at the top. The bushing 157 is slideable on the stud. A spring 159 is seated in the recess at the bottom and engages the flange of the bushing at the top. A sleeve 161 is mounted about each stud 155. The sleeve 161 is slideable on the bushing 157 and on the outer wall of the recess. A light tension spring 162 extends between an ear 164 on each sleeve 161 and a tab 166 on the associated actuating plate 145. The sleeves 161 which are mounted at a position of drive rod 45 for a moderator rod are bridged by a plate 163 (FIG. 7) which has a generally key-shaped slot 165 for receiving the stem 53 of this drive rod and a spherical seat 167 for engaging the tip 55 of this drive rod. The sleeves which are mounted at a position of each drive rod 49 for a control rod are bridged by a plate 169 (FIG. 9) which has a slot 171 for engaging the neck 61 of the drive rod 49 and a spherical seat 173 for the head 59 of this drive rod. In the retracted position of each actuating plate 145 (right-hand plate 145, FIG. 6) the bridging plate 163 or 169 is disconnected from the corresponding drive rod 45 or 49. In the advanced position of each actuating plate 145 (other than right-hand plate 145, FIG. 6), the bridging plate 163 or 169 is connected to the corresponding drive rod.

Figure 11:
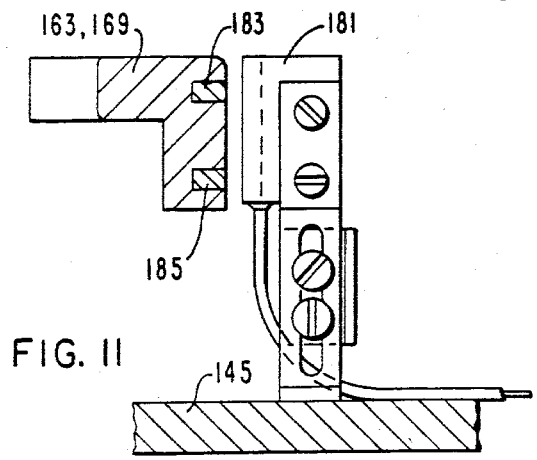
FIG. 11 is a fragmental view in section taken along line XI—XI of FIG. 7 and showing the mechanism for detecting excessively high or low load on a drive rod.
Figure 12:
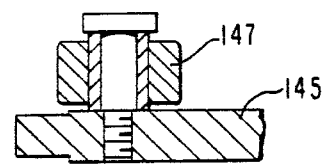
FIG. 12 is a fragmental view in section taken along line XII—XII of FIG. 7.
Figure 6A:
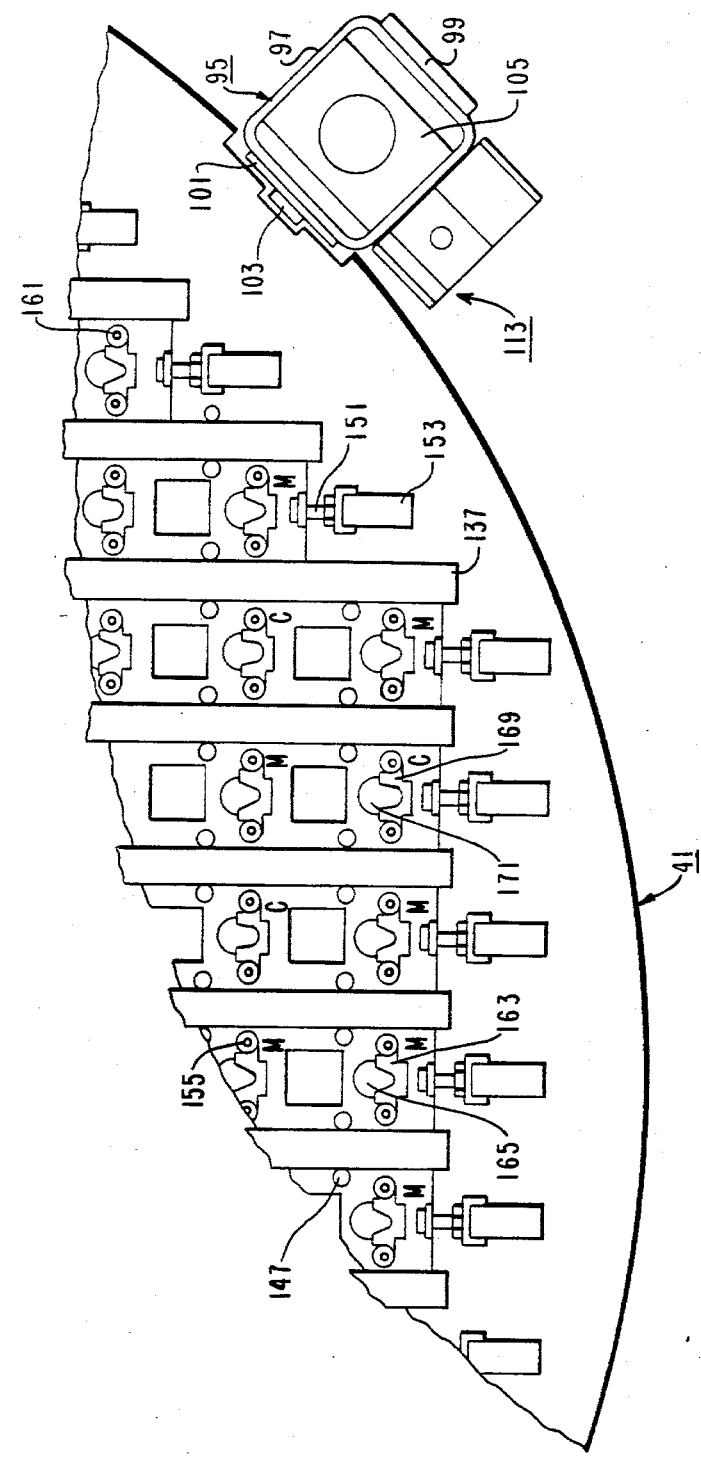
FIG. 6A is a fragmental view of a small portion of FIG. 6 enlarged.
Figure 7:
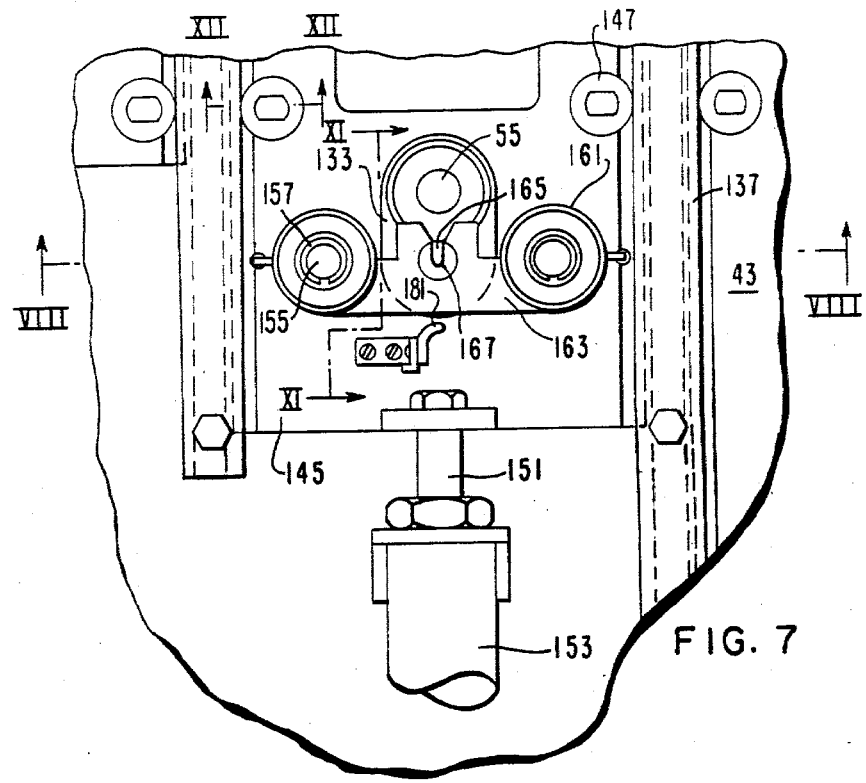
FIG. 7 is a fragmental view enlarged of the part of the apparatus within the rectangle VII of FIG. 6, showing particularly the engaging and disengaging mechanism for the drive rods for the moderator rods.
Figure 8:
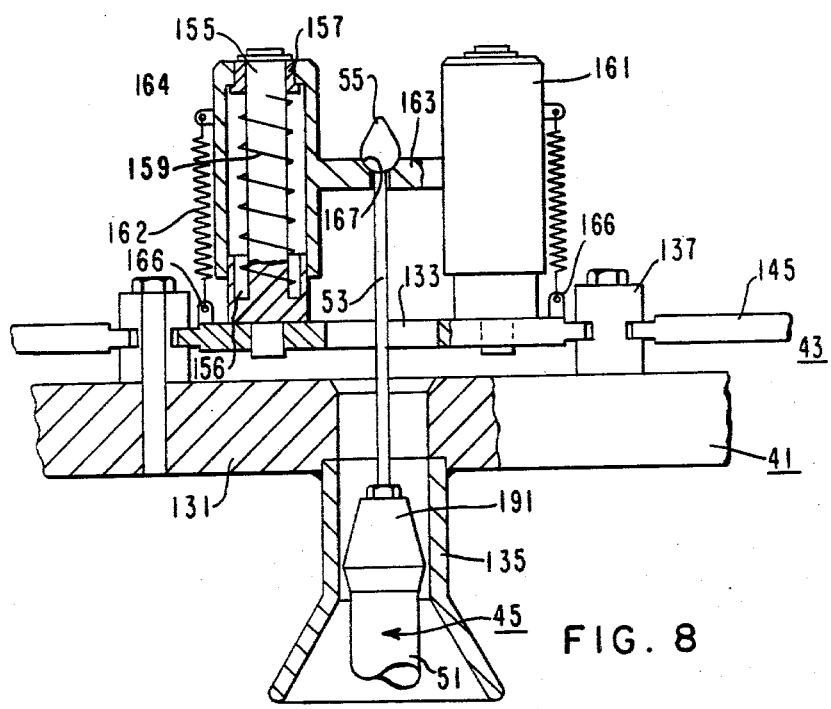
FIG. 8 is a view in section taken along line VIII—VIII of FIG. 7.

A magnetically actuable, reed type limit switch 181 is mounted on each actuating plate 145 for each drive-rod position (FIGS. 7, 11). The limit switch is spaced a short distance from the corresponding bridging plate 163 or 169 and its actuating arm is disposed along the longitudinal axis of the bridging plate. Each bridging plate 163 or 169 carries magnetic plugs 183 and 185. In the standby position of each plate 163 or 169, the limit switch 181 is positioned centrally between the magnets 183 and 185 and is unactuated. When the sleeves 161 and the bridging plate 163 or 169 are moved upwardly or downwardly relative to the actuating plate 145, the switch is actuated.

The springs 159 are preloaded to support the static weight of the corresponding drive rod and drive line without deflecting. If a drive rod 45 or 49 is excessively loaded, as for example, when a moderator rod or a control rod encounters an obstruction, the spring 159 is deflected downwardly, the corresponding sleeves 161 and bridging plate 163 or 169 move downwardly and magnet 183 actuates switch 181. Typically, loading of any drive rod by 350 to 500 pounds above its weight would constitute excessive loading. Conversely, if the drive rods 45 and 49 and their moderator rods or control rods are being lowerd and the loading on a drive rod is reduced because the corresponding moderator or control rod encounters an obstruction, the drive line including the rods is stopped at the obstruction. The lift plate 41 and the parts connected to it continue to move downwardly. Ultimately, the larger diameter part 191 or 193 of a drive rod 45 or 49 raises the bridging plate 163 or 169, raising magnet 185 and actuating switch 181. Switch 181 when actuated enables an alarm. Springs 162 supply a small restoring force to the sleeves 161.

The removal of the moderator and control rods from a reactor 21 will first be described. It is assumed that initially the drive rods 45 and 49 are set in the lowermost position with the moderator and control rods in the thimbles in the fuel assembly after the head of the reactor is removed. The lifting rig 39 (FIG. 1) with the lift plate 41 held at the lower level by the latches 113 is secured to the flanges 37 of the upper support plate 29 by the ROTO-LOC securing device. The latches 113 at the lower level are retracted and the lift plate 41 is lowered by means of the cables 77 so that the tops of the drive rods 45 and 49 pass through the guides 135 and extend upwardly with the bases of their tips 55 and 59 (FIGS. 8, 10) aligned with the seats 167 and 173 of the bridging plates 163 and 169. If the operation proceeds normally, the cylinders 153 (FIG. 6) are actuated to advance the actuating plates 145 so that the tips 55 and 59 of the drive rods 45 and 49 are seated in the seats 167 and 173. The lift plate 41 is raised by means of the cables 77 to the upper level 131 and is supported at the upper level by the latches 113 at this level. If any drive rod is subject to excessive loading, the corresponding switch 181 is actuated and an alarm is displayed or sounded. The lift plate 41 is shown in broken lines at the upper level. In this position of the lift plate 41, the drive rods 45 and 49 are in the uppermost position and the moderator and control rods are in their guides (not shown) in the upper internals. The lifting rig 39 is now raised and transferred away from reactor 21 by a crane connected to rod 89. The non-rod refueling now proceeds.

The reinsertion of the drive rods 45 and 49 and the moderator and control rods will now be described. It is assumed that the lifting rig, with the lift plate on the upper level, and the drive and penetrating rods suspended from it in the guides in the upper internals, is out of the reactor 21 where it was positioned prior to the start of the refueling. The lifting rig 39 is returned to the reactor 21 by the crane and the upper internals 23 are mounted in the reactor 21 with the control and moderator rods in the guides. The upper latches 113 are retracted and the lift plate 41 and the parts attached to it is lowered to its lowermost position by the hoist connected to cables 77. If there is an obstruction which stops any drive rod 45 or 49, switch 181 is actuated and an alarm is displayed or sounded. With the lift plate 41 at the lowermost position, the cylinders 153 are actuated to retract the actuating plates. The moderator and control rods are now in the thimbles of the fuel assembly. The lift plate is now raised and deposited on the latches 113 at the lower level. The ROTO-LOC securing means is disconnected and the lifting rig 39 is removed from the reactor 21. The refueling may now be completed.

While preferred practice and embodiment of this invention have been disclosed herein, many modifications thereof are feasible. This invention is not to be restricted except insofar as is necessitated by the spirit of the prior art.

I claim:

1. In the unrodded refueling of a nuclear reactor having upper internals and fuel assemblies with apparatus including a lifting rig and a lift plate, said lift plate being removably supported in a lower position on said lifting rig, the method of removing, from said fuel assemblies, the rods which penetrate into said fuel assemblies, such as the control rods and/or the coolant-displacement rods, said penetrating rods being connected to drive rods, said drive rods being actuable to move said penetrating rods between said upper internals and penetration into said fuel assemblies, said drive rods and control rods connected to them being arrayed in a plurality of rows, said lift plate having a plurality of actuatable plates, each actuable plate cooperative with a said row, each said actuatable plate having a plurality of drive-rod engaging means, each said drive-rod engaging means to engage a said drive rod on actuation of said each actuatable plate; the said method comprising, securing the lifting rig to the supporting structure of said upper internals of said nuclear reactor, removing said lift plate from said lower position on said rig and positioning said lift plate with each said actuatable plate with each of its engaging means positioned to engage its associated said drive rod, actuating said each said actuatable plate to cause said each said engaging means to engage its associated said drive rod, raising said lift plate with said drive rods engaged in said actuable plate to lift said drive rods and said penetrating rods, whereby said drive rods and penetrating rods are suspended from said lift plate, supporting said lift plate with the drive rods and penetrating rods suspended therefrom in an upper position on said lifting rig, and removing said lifting rig with said lift plate, drive rods and penetrating rods supported thereon and said upper internals suspended therefrom.

2. In the unrodded refueling of a nuclear reactor having upper internals and fuel assemblies with apparatus including a lifting rig and a lift plate, the upper internals of said reactor being secured to said lifting rig, the method of reinserting, in fuel assemblies of said reactor, the rods which penetrate into said fuel assemblies, such as the control rods and/or coolant-displacement rods, said penetrating rods being connected to drive rods, said drive rods being actuable to move said penetrating rods between said upper internals and penetration into said fuel assemblies, said drive rods and control rods connected to them being arrayed in rows, said lift plate having a plurality of actuatable plates, each actuatable plate cooperative with a said row, each said actuatable plate having a plurality of drive rod engaging means, each said drive-rod engaging means engaging a said drive rod, the said drive rods and penetrating rods while so engaged being suspended from said lift plate, said lift plate and said rods suspended therefrom being supported on a removable support in an upper position on said lifting rig; the said method comprising, lowering said lifting rig, with the upper internals secured thereto and the lift plate and the rods suspended therefrom supported on said lifting rig into said reactor to position said upper internals in said reactor, removing said lift plate from said upper position on said lifting rig and lowering said lift plate with said rods suspended therefrom so that said rods are lowered into said reactor and said penetrating rods penetrate into said fuel assemblies, supporting said lift plate with the rods suspended therefrom in a lower position on said lifting rig, actuating said actuatable plates to disengage the drive rods from said drive-rod engaging means, disengaging said lifting rig from the upper internals of said reactor, and removing said lifting rig and said lift plate from said reactor.

3. Apparatus for removing the rods which penetrate into fuel assemblies of a nuclear reactor having upper internals during the unrodded refueling of said reactor or the like, the said penetrating rods including control rods and/or water-displacement rods, a plurality of drive rods being connected to said penetrating rods, said drive rods and the penetrating rods connected to them being arrayed in rows; the said apparatus including a lifting rig, means, on said lifting rig, for securing said rig to the structure of said upper internals, a lift plate, said lift plate having a plurality of actuable plates, each said actuable plate to cooperate with a said row of drive rods and connected penetrating rods, a plurality of drive-rod engaging means connected to each said actuable plate, each said drive-rod engaging means, on actuation of said each said actuable plate, to engage a drive rod of the row of drive rods with which row said each said actuable plate is cooperative, means, connected to said each said actuable plate, for actuating said each said actuable plate; each said drive-rod engaging means of each said actuable plate having a slot having a narrow section communicating with an expanded section, said narrow section having a seat for a drive rod, each drive rod in the row with which said each said actuable plate cooperates being out of said narrow section when said each said actuable plate is unactuated, said each said actuable plate on actuation by said actuating means being translated relative to the drive rods in the row with which said each said actuable plate cooperates causing each drive rod to be seated on its associated seat in said narrow section; means, on said lifting rig, for removably supporting said lift plate in an upper position and in a lower position, means, connected to said lift plate, for lifting and lowering said lift plate relative to said lifting rig between said positions, and means, connected to said lifting rig, for lifting, lowering and removing said lifting rig.

4. In the unrodded refueling of a nuclear reactor having fuel assemblies and upper internals with apparatus including a lifting rig and a lift plate, said lift plate being removably supported in a lower position on said lifting rig, the method of removing from said fuel assemblies, the rods which penetrate into said fuel assemblies, such as control rods and/or coolant displacement rods, said penetrating rods being connected to drive rods, said drive rods being actuable to move said penetrating rods between said upper internals and penetration into said fuel assemblies; the said method comprising, securing said lifting rig to the supporting structure of said upper internals, removing said lift plate from said lower position on said rig and connecting said lift plate to said drive rods, raising said lift plate to lift said drive rods and said penetrating rods, whereby said drive rods and said penetrating rods are suspended from said lift plate moveable towards an upper position on said lifting rig, while said lift plate is being raised, monitoring each said drive rod for excessive loading, producing a response on the occurrence of excessive loading, in the absence of excessive loading on any drive rod raising said lift plate to said upper position and supporting said lift plate and said drive rods and penetrating rods suspended therefrom in said upper position, removing said lifting rig with said lift plate, drive rods and penetrating rods supported thereon and said upper internals suspended therefrom.

5. In the unrodded refueling of a nuclear reactor having fuel assemblies and upper internals with apparatus including a lifting rig and a lift plate, the upper internals of said reactor being secured to said lifting rig, the method of reinserting in said fuel assemblies of said reactor, the rods which penetrate into said fuel assemblies, such as control rods and/or coolant-displacement rods, said penetrating rods being connected to drive rods, the said drive rods and penetrating rods being suspended from said lift plate, said lift plate and said drive rods and penetrating rods suspended therefrom being supported on a removable support in an upper position on said lifting rig; the said method comprising, lowering said lifting rig, with said upper internals secured thereto and said lift plate and the rods suspended therefrom supported on said lifting rig, into said reactor to position said upper internals in said reactor, removing said lift plate from said upper position on said lifting rig and lowering said lift plate with said drive rods and penetrating rods suspended therefrom so that said rods are lowered into said reactor towards penetration into said fuel assemblies, monitoring the lowering of said rods and the penetration of each of said rods into said fuel assemblies to determine if any of said rods has encountered an obstruction, and producing a response on the determination of the existence of an obstruction and, in the absence of an obstruction for any rod, lowering said rods fully into said reactor with said penetrating rods penetrating fully into said fuel assemblies, on completion of said last-named full lowering of said lift plate and said rods suspended therefrom, supporting said lift plate and said rods suspended therefrom in a lower position on said lifting rig, with said lift plate and said rods suspended therefrom in said last-named lower position, disengaging said lift plate from said rods so that said rods remain positioned in said reactor, thereafter disengaging said lifting rig from said upper internals and removing said lifting rig and said lift plate from said reactor.

6. Apparatus for removing the rods which penetrate into fuel assemblies of a nuclear reactor having upper internals during the unrodded refueling of said reactor or the like, the said penetrating rods including control rods and/or water-displacement rods, a plurality of drive rods being connected to said penetrating rods; said drive rods and the penetrating rods connected to them being arrayed in rows; the said apparatus including a lifting rig, means, on said lifting rig, for securing said rig to the structure of said upper internals, a lift plate, said lift plate having a plurality of actuable plate, each said actuable plate to cooperate with a said row of drive rods and connected penetrating rods, a plurality of drive-rod engaging means connected to each said actuable plate, each said drive-rod engaging means, on actuation of said each said actuable plate, to engage a drive rod of the row of drive rods with which row said each said actuable plate is cooperative, means, connected to said each said actuable plates, for actuating said each said actuable plate, means, on said lifting rig, for removably supporting said lift plate in an upper position and in a lower position, means, connected to said lift plate, for lifting and lowering said lift plate relative to said lifting rig from said positions, and means, connected to said lifting rig for lifting, lowering and removing said lifting rig.

7. The apparatus of claim 6 wherein the actuating means for each actuable plate includes fluiddrive means, connected to said each actuable plate for advancing said engaging means of said each actuable plate between drive-rod engaging and driverod disengaging positions.

8. Apparatus for removing and replacing the rods which penetrate into the fuel assemblies of a nuclear reactor, such as the control rods and/or the coolant-displacement rods, during the unrodded refueling of a nuclear reactor to the like, a plurality of drive rods being connected to said penetrating rods and said reactor having upper internals; the said apparatus including a lifting rig, means, on said lifting rig, for securing said rig to the structure of said upper internals, a lift plate, means, on said lifting rig, for removably supporting said lift plate in an upper position and in a lower position, means, on said lift plate, for removably engaging said drive rods, means connected to said lift plate, for lifting and lowering said lift plate relative to said lifting rig, means, connected to said lift plate, responsive to an obstruction to the raising or lowering of any said penetrating rod for indicating the presence of said obstruction, and means connected to said lifting rig, for lifting, lowering and removing and lifting rig.

9. The apparatus of claim 8 wherein the penetrating rods and the drive rods connected to them, which are to be removed, are arrayed in rows and the lift plate includes a plurality of actuable plates each plate cooperative with a said row, each said actuable plate including drive-rod engaging means to engage or disengage the drive rods in each row on actuation of said each actuable plate, and wherein the obstructed indicating means includes switch means on each actuable plate, responsive to an obstruction to any penetrating rod, with which said each actuable plate is cooperative, to indicate said obstruction.

* * * * *